United States Patent Office 3,457,230
Patented July 22, 1969

3,457,230
INVERT EMULSION POLYMERIZATION OF ACROLEIN
George T. Kekish, Chicago, Ill., assignor to Nalco Chemical Company, Chicago, Ill., a corporation of Delaware
No Drawing. Filed Oct. 16, 1967, Ser. No. 675,363
Int. Cl. C08f $1/13, 1/60, 3/40$
U.S. Cl. 260—67                                  9 Claims

ABSTRACT OF THE DISCLOSURE

The present invention is directed towards an invert emulsion process for the polymerization of an $\alpha:\beta$ ethylenically unsaturated aldehyde, and in particular is directed to the homo-polymerization of an acrolein-water mixture using a high boiling inert non-solvent in which both the monomeric acrolein and water in the acrolein water mix are insoluble. This non-solvent is selected from aliphatic and aromatic solvents with a boiling range from about 200–600° C. Examples of this inert non-solvent are commercially used mineral oils of aliphatic origin and heavy inert aromatic solvents of comparable boiling points in which the acrolein-water mix is insoluble. The terms *insoluble* and *immiscible* in the present invention include solubility up to 10%. A water-in-oil emulsion is formed using a polyacrolein bisulfite adduct as emulsifier and the polymerization of the acrolein occurring in the aqueous phase is initiated by a unique combination of a redox system consisting of a dual oxidant component comprising ammonium persulfate and an active hydroperoxide or peroxide. A synergistic effect was observed in the oxidant combination, and this effect was more marked when the preferred hydroperoxides were used, and was optimum with the use of tertiary alkyl hydroperoxides. A most preferred hydroperoxide is tertiary butyl hydroperoxide, and a most preferred ratio persulfate/hydroperoxide is about 4:1 with preferred ratios showing a predominance of the persulfate oxidant component (ratios by weight).

The reducing component of the redox is the conventionally prepared polyacrolein bisulfite adduct which also acts as an aqueous emulsifier.

A ratio acrolein: water: heavy non-solvent is initially preferably about 1:1:1 parts by weight and as the reaction proceeds by the preferred process the mixture is diluted with heavy non-solvent incrementally to control viscosity and give a final ratio of about 1:1:3 parts by weight. Alternatively, the initial ratio of acrolein: water: heavy non-solvent may be about 1:1:3 with no further addition of heavy non-solvent during the progress of the polymerization reaction.

The use of the heavy non-solvent and the unique combination of the dual oxidant component of the redox operating synergistically with the bisulfite reducing component are asserted for invention and novelty. The remainder of the process is standard and well known in the art. For instance, such features as an inert atmosphere (e.g. $N_2$); the preferred polymerization temperature of about 30° C.; separation and recovery of the polyacrolein polymer by lower aliphatic hydrocarbon solvents such as pentane, hexane and heptane; and other process features are old and conventional in the art. Additionally, the non-inventive process limitations of the present process follow the teachings of the analogous 3,069,389 (Welch), Columns 1–7 inclusives, and refer to Generalized Process, post.

BACKGROUND OF THE INVENTION AND THE PRIOR ART

Historically, in the literature it is noted that emulsion type polymerization of vinyl compounds is frequently the treatment of choice where high yields and molecular weights are necessary. This is true of acrolein and particularly the homopolymerization of acrolein where two phase polymerization appears to favor addition polymerization through the double bond, rather than interfering or competing polymerization of the 1,4 variety through the active oxygen of the aldehyde carbonyl group.

In related patent art total non-aqueous two phase systems, the use of phase differentiation and an inert diluent is taught in Miller U.S. 2,657,192. This patent teaches primary alcohols as the polymerization medium and uses hydrocarbon diluents such as toluene, xylene and n-octane as the continuous phase.

Again, in illustrating non-aqueous two phase polymerization, Eifert et al. U.S. 3,054,774 uses a non-aqueous reaction medium for polymerizing $a:\beta$-ethylenically unsaturated aldehydes. The medium set out was a secondary alcohol in a non-polar diluent. A variety of inert diluents was used, including non-polar aromatic and aliphatic hydrocarbons. The statement is made that the diluent should be inert towards the monomer, but there is no teaching of the requirement of insolubility of the monomer in the diluent, and more particularly no teaching of the insolubility of both components of the acrolein-water mixture in the inert diluent since there is no aqueous medium. The non-aqueous systems have been criticized as producing low molecular weight products.

Polymerization of acrolein or more specially homo-polymerization of acrolein in a strictly aqueous solution is taught in a related application of James et al. entitled, "Polymerization Process," filed Jan. 12, 1965, S.N. 425,070. In the total aqueous technique it has been found that there are several difficulties in commercial utilization. Firstly, and most prominantly, the acrolein monomer has been found to be too soluble in water (about 20%). The solubility of the monomer in water overthickens the solution due to the formation of hydrates, and further the acrolein solubility lessens the yield. Finally, it was found that although polyacrolein is insoluble in water and readily precipitates in an aqueous environment, the polymer absorbs large quantities of water. Thus, intermediate in the polymerization reaction the solution tends to become too viscous for the necessary agitation to break up polymer lumps formed during the reaction.

The direct prior art picture into which the present invention falls may best be described as polymerizing $\alpha:\beta$-ethylenically unsaturated aldehydes in an invert water-in-oil type emulsion where the phase differential is partially aqueous. Welch U.S. 3,069,389 is a landmark patent in this art. After distinguishing non-aqueous polymerization at column 1, lines 13–31 and the *all*-aqueous polymerization at column 1, lines 33–64 with their attendant difficulties, the patentee Welch then deals directly with invert water-in-oil emulsion polymerization, and the present invention is an improvement of the Welch process in two key respects. Firstly, in Welch '389 it is noted that the *monomer* in an aqueous mix is soluble in the continuous phase as follows from column 2, lines 35–59:

"Any excess acrolein over that which is soluble in the aqueous diluent is initially contained in the continuous phase, i.e. the non-aqueous diluent in which the monomer is also soluble and is absorbed into the aqueous phase as a polymerization reaction proceeds."

At column 4 the patentee mentions as diluents, saturated aliphatic hydrocarbons containing 4–18 carbon atoms as suitable for the non-aqueous diluent but he makes no selection on the basis of monomer solubility and he prefers pentane and heptane because of their availability and inertness, and these are used in the examples.

Of interest is the following statement made relative to the polymerization of acrolein in 3,248,355 (Welch et al.) at column 3, line 75, through column 4, line 2:

"The aqueous diluent can consist entirely of water, or can comprise a mixture of water and *one or more conventional inert organic diluents.*"

The present invention is directed towards an improvement over the inert water-immiscible organic diluent of Welch to the selection of a diluent in which both components of the acrolein monomer-water mix are insoluble. This improves operating conditions by eliminating the dispersion of the acrolein in the non-aqueous phase.

Secondly, Welch does not teach the unique catalyst combination of the present invention applied to the reaction. Redox systems are old in the art and old in homopolymerization of acrolein. The closest pertinent patent art relative to the catalyst is 3,196,130 (Goltner et al.) in the related art of copolymers of acrolein and acrylonitrile. At column 2, lines 3–5, relative to the redox system, the following statement appears:

"Alternatively, systems containing more than one oxidizing and/or more than one reducing component may be used."

There is no futher discussion of this statement. The present invention, as to the catalyst, depends for novelty upon a synergistic combination of a dual oxidant component of the redox, combined with a single specified reducing component, namely polyacrolein bisulfite adduct. The synergistic combination of the oxidant component is achieved by using ammonium persulfate and a hydroperoxide or peroxide of the general formula R–OOH in which R represents an aliphatic, cycloaliphatic, or arylaliphatic radical. Preferred compounds for the hydroperoxides are the alkyl hydroperoxides, and a most preferred compound which emphasizes synergism is tertiary butyl hydroperoxide.

HEAVY INERT ORGANIC NON-SOLVENT DILUENT

This process particularly contemplates homopolymerizing acrolein in an invert or water-in-oil emulsion. The acrolein monomer and water is contained in the aqueous or discontinuous phase and the continuous phase is specially selected so that neither the acrolein monomer nor the water in the acrolein-water mix will be soluble or miscible in the oil or continuous phase. The problem faced, that of retention of acrolein in the aqueous phase, was not understood in the direct prior art. For example, in 3,069,389 (Welch) column 4, lines 3–9 inclusive, the patentee can use hydrocarbons of from about 4–18 carbon atoms as inert water-immiscible organic compounds, but prefers in the text and examples pentane and heptane "because of their availability and inertness." The low molecular weight compounds have such a structure that the acrolein in the acrolein-water mix is substantially miscible with them.

In the present invention the problem of the solubility of the monomer in the inert diluent was recognized after testing and rejecting many solvents such as, for example, benzene, toluene, xylene, hexane, heptane, etc. which are acrolein miscible and not suitable fo rthe present non-solvent process.

The term heavy inert organic non-solvent diluent (and like phrases) in which both the acrolein monomer and water of the aqueous phase are insoluble are designed to define compounds and compositions which are substantially insoluble and whose solubility is limited to $\leq 10\%$.

The terms "solvent" and "non-solvent," consonant with commercial usage, are used interchangeably with the sole requirement that the miscibility of either with the acrolein water mix be $\leq 10\%$.

Preferred non-solvent diluents (solvents) which may be utilized in this invention are (1) primarily aliphatic heavy non-solvents, (2) mineral oils and (3) mixed aliphatic, aromatic non-solvents in which the acrolein-water mixture is insoluble or slightly soluble ($\leq 10\%$). The cut or fraction of the non-solvents encompassed by the present invention has a molecular weight and classification substantially greater than the applicable prior art teachings, and the useful non-solvents have a boiling point in the medium range of between about 175–600° C. One preferred solvent of the present invention is a solvent (non-solvent) which is an odorless, heavy non-solvent having a medium boiling range. It is also called deodorized kerosene or Espesol #375. Additional preferred non-solvents are selected mineral oils which consist principally of saturated aliphatic hydrocarbons and are known as "white mineral oils" and are substantially free of unsaturates and aromatics. They are non-volatile and boil at temperatures of about 175–600° C. Some examples of mineral oils suitable for use in the present invention are "Liquid Paraffin Heavy," a colorless mineral oil having a boiling range of approximately 200–396° C. at atmospheric pressure, a viscosity of 68 centistokes (300–320 Saybolt seconds) at 100° F., a specific gravity of 0.886 at 60° F. compared to water at the same temperature, and containing 100% unsulfonated residue: "Fractol A," a colorless mineral oil having a boiling range of about 328–403° C., a viscosity of 44 centistokes (204.5 Saybolt seconds) at 100° F., a specific gravity of 0.8811 at 60° F. and containing no unsaturation; "White Mineral Oil #4695," having a boiling range of about 295–406° C., a viscosity of 31.5 centistokes (147.5 Saybolt seconds) at 100° F. and containing 100% unsulfonated residue (this oil was obtained from Standard Oil Company of Indiana); "Superla White Oil #11232," having a boiling range of 298–396° C. and a viscosity of 17.5 centistokes (85–90 Saybolt seconds) at a 100° F.; "Superla White Oil #9," a nearly colorless mineral oil having a viscosity of 17.12 centistokes (85.5 Saybolt seconds) at 100° F.; and "Eureka White Oil," a colorless mineral oil having a viscosity of 10–11 centistokes at 100° F.

The initial proportion of the heavy non-solvent diluent can be varied over ranges from about 1 to about 4 parts by weight for 1 part by weight of acrolein monomer. Using the preferred dilution method an initial 1:1 ratio by weight is utilized which, during the reaction, is sequentially diluted to about a preferred 3:1 diluent/monomer by weight. Substantial increase in rate of reaction and desired molecular weight of product are achieved by the present reaction where there is no migration of the acrolein monomer into the organic phase. It has been found that higher proportions of the non-aqueous diluent/acrolein can be used operably but to no advantage. On the other hand, sufficient diluent is necessary to adequately disperse the polyacrolein product and thus the lower limit of about 1:1 is necessary to facilitate control over the polymerization reaction.

INITIAL CONCENTRATION OF WATER

The initial concentration of water used as polymerization medium in this process can vary from about 0.2 to about 2 parts by weight based upon the water/acrolein ratio, with a preferred range of about 1.0 to 1 by weight of water per part of acrolein. It is noted that higher proportions of water to acrolein than those stated above are difficult to disperse in the non-solvent diluent. The use of less proportions of water may adversely affect the properties of the polyacrolein products so that it is harder and less tractable.

It is essential that in this reaction the aqueous diluent containing the emulsifier be of an acid pH of less than 7 and preferably in the range from about 1 to 3. This is achieved by the natural acidity of the bisulfite adduct and the initial acid pH control as by mineral acid addition. It has been found that when the diluent has a pH above 7, unwanted side products caused by condensation polymerization occur and result in the production of a low molecular weight product.

THE COMPOUND REDOX CATALYST SYSTEM

The present catalyst system involves an improvement over the prior art adapted especially for $\alpha,\beta$-ethylenically unsaturated aldehydes such as acrolein, preferably, and to methacrolein and $\alpha$-ethyl acrolein. This system could also be operable in combinations where polymerization is not of the homopolymerization variety, but involves the copolymerization of such an aldehyde with other ethylenically unsaturated monomers such as acrylonitrile, itaconic acid and the like, where addition polymerization proceeds through the C=C.

Redox systems for unsaturated aldehydes have been known in the past and the current state of the art may well be understood following the teachings of 3,277,057 (Campanile), particularly at column 2, line 59, through column 3, line 34 setting out free radical oxidants and reducing components. However, it was found that the haphazard use of any redox combination gave rise to certain failings in the product. For example, when homo or copolymerization of acvrolein was attempted using ferrous ammonium sulfate as the reducing agent, the polymer disadvantageously retained certain properties of the ferrous/ferric salt combination and was deficient for certain uses such as dielectric purposes and the paper arts. Again, as to the oxidant component of the redox, no single redox oxidant gave satisfactory results demanded where plant use and economics were contempelated.

It was found that the prior art processes combining persulfate and bisulfite will not produce the results of the present invention. For example, 3,084,992 (Schlack et al.) describes an alkali persulfate/alkali bisulfite redox system wherein the bisulfite may be derived from an acrolein bisulfite adduct. It was also found in screening for a better redox system for the aldehyde system that the combination of the tertiary alkyl hydroperoxide/alkali bisulfite adduct was not satisfactory for commercial plant purposes. The explanation for this is not altogether clear. However, it is theorized that it does revolve around the presence of the $HSO_3^-$ ion which apparently in the function as the reducing segment of the redox catalyst requires both of the present oxidant components.

The present invention overcomes many of the difficulties of the prior art which would face a worker in the art, as well as the practical experience leading up to the present invention. Summarly, the present invention, as to the redox system, requires preferably a major amount of ammonium persulfate and a minor amount of a tertiary alkyl hydroperoxide. The selection of the tertiary alkyl hydroperoxide was on the basis of yields pointing towards a synergistic effect wherein these particular oxidizing agents were combined. The addition of a minor amount of tertiary alkyl hydroperoxide apparently superactivates the greater amount of the ammonium persulfate, so that the two in combination act catalytically with activity greater than their additive effects. Among the preferred tertiary alkyl hydroperovides which can be utilized for the present invention are tertiary butyl hydroperoxide, tertiary amyl hydroperoxide, tertiary hexyl hydroperoxide, etc.

Operable but not preferred are aryl hydroperoxides such as cumene hydroperoxide and peroxides such as lauryl peroxide, benzoyl peroxide, dicumyl peroxide, etc.

The ratio of persulfate/alkyl hydroperoxide may range from about 5:1 to about 1:5 by weight and a most preferred ratio is about 4:1 by weight. The equivalent molar ratio of persulfate/alkyl peroxide is from about 3:1 to 1:3. A most preferred combination for activity for the catalyst in the present invention is ammonium persulfate/ tertiary butyl-hydroperoxide in the ratio of about 4:1 by weight. Thus although combinations favoring persulfate predominance are preferred, the opposite ratios are operable.

Moreover, the mixed crucial oxidant component of the present invention may have a make up of a persulfate/ hydroperoxide ratio varying from about 5:1 to 1:5. Again, increased synergistic effect of this combination is achieved when the persulfate fraction is superior to the hydroperoxide fraction. Thus an optimum ratio is about 4:1 persulfate/hydroperoxide.

The concentration of the free radical persulfate fraction in the redox may function within wide limits and operable for this invention are the catalyst concentration ranges of the disclosure 3,069,389 (Welch at column 6, line 59, through column 7, line 4: namely preferred 0.05–2% by weight of the acrolein monomer (solids). Additionally, by the present combination redox it has been possible to use lower operable free radical promoters such as a concentration of 2 mM persulfate/M acrolein and with about ¼ as much preferred for the hydroperoxide cosynergist.

The concentration of the reducing agent component can vary, for example, from about .5 percent by weight, or lower, to about 10% by weight (of solids), or higher, based on the weight of the acrolein monomers; and since the bisulfite adduct acts also as a water-in-oil emulsifier, these ranges are also applicable to its function as an emulsifier.

It has been found that high concentrations of catalysts above the upper limit, relative to the concentrations of the acrolein monomers, leads to the formation of undesirable low molecular weight polymers only. Furthermore, concentration of catalysts below the minimum value result in uneconomic, low polymerization rates.

GENERALIZED PROCESS OF HOMOPOLYMERIZATION OF ACROLEIN BY INVERT EMULSION TECHNIQUE

Step 1.—Preparatory to treatment the reactor was purged with nitrogen, vacuum was applied, and then purged again with prepurified nitrogen. Such treatment (i.e. purging and inert atmosphere) is conventional: see 3,084,992 (Schlack et al.), example 12. Welch 3,069,389, column 5, lines 53–62, denotes other gases useful in providing an inert atmosphere to prevent oxidation of the acrolein monomer. These gases include carbon dioxide, argon, methane, ethane, and the like.

Step 2.—After purging the reactor, 75 parts of DI water was added. (DI water is used so that the dissolved oxygen in the water is removed. Further, in order to completely remove dissolved oxygen from DI water, oxygen can be eliminated by either boiling or purging with nitrogen. Due to the sensitivity of the acrolein, tap water is not operable, but the DI or treated DI water is required.)

Step 3.—Fifteen parts of a 20% polyacrolein Na bisulfite adduct was added and mixed slowly to insure homogeneous solution. The addition of the acid emulsifier reduced the pH to the acid side (15 parts 20% emulsifier). It is noted that for the purposes of the present invention the bisulfite adduct acts both as an emulsifier and as the reducing component for the redox system. Kern et al. 3,206,422 teaches the use of the polyacrolein bisulfite adduct as sole emulsifying agent in acrolein polymerization. The emulsifier was prepared by acidifying a commercially obtained polyacrolein-$NaHSO_3$ adduct (20%) with concentrated HCl to reach a pH of 1.5.

Step 4.—100 parts of monomeric acrolein was distilled into the reactor.

Step 5.—Add 20 p.p.m.'s of hydroquinone. This feature is conventional in the art. For example, 2,401,776 (Rothrock) at column 1, teaches the use of hydroquinone in the polymerization of acrolein as a condensation polymerization inhibitor. Addition of hydroquinone inhibitor is optional. It is recommended because of safety. Uninhibited acrolein will produce polymer in better yield.

Step 6.—100 parts of heavy inert non-solvent was added. All dissolved oxygen must be removed from the solvent by purifying with nitrogen.

Step 7.—Agitate for 15 minutes to make a good emulsion. Dependent upon the rate of agitation and the volume of the vessel, particularly, the obtaining of a good emulsion may require more or less time.

Step 8.—The ammonium persulfate component was added by dissolving in this case 0.815 part of ammonium persulfate in 10 parts of DI water and the solution was added slowly over several minutes to the reactor (5 minutes).

Step 9.—After a time interval of about 5 minutes, the peroxide oxidant was added. In this case 0.2 part of tertiary butyl hydroperoxide was added to the reactor.

Step 10.—The reactants having been furnished to the reactor, the system was closed and slight nitrogen pressure was applied for the reason stated in 1. A convenient pressure above atmospheric is 2 to 3 p.s.i.

Step 11.—The reaction temperature was set at 30° C. and maintained at the optimum 30–32° C. during the exothermic polymerization reaction. Control of the temperature during the reaction was by cooling. This temperature is conventional and preferred for invert emulsion polymerization of acrolein. Variations from about 30° C. are discussed in 3,069,389 (Welch) at column 7, lines 5–12, in connection with this type reaction.

Step 12.—By observing the viscosity of the polymerization slurry and noting the formation of large agglomerates, dilute portion wise as needed with heavy non-solvent purged with nitrogen. During the first 3 hours of the reaction as necessary by over viscosity of the slurry and the presence of large agglomerates the heavy inert non-solvent was added incrementally (inert heavy non-solvent $N_2$ purged). Usually the diluted heavy non-solvent was added during a period of ½–3 hours from the time of the addition of the catalyst. A total of about 200 additional parts of heavy non-solvent was added.

This method of the incremental addition of the heavy inert non-solvent is the preferred method of operation. However, it is possible to commence the operation with the total heavy inert non-solvent needed. In both methods the total of heavy inert non-solvent diluent is in about the ratio of water:acrolein:heavy non-solvent, 1:1:3 and in the incremental method the initial ratio of heavy non-solvent is about water:acrolein:heavy non-solvent, 1:1:1 by weight.

Step 13.—After 6 hours the reaction was terminated. The time for the homopolymerization reaction for most runs was about 6–8 hours. Again, the time being generally inversely proportional to yield, the time for this polymerization reaction may vary broadly. For example, as noted in 3,069,389 (Welch) column 7, lines 13–21, analogous polymerization periods have been noted ranging from about 30 minutes or less to about 100 hours or more, depending upon temperature, catalyst, concentration, etc.

Step 14.—After completion of the reaction about 2 parts of sodium bisulfite dissolved in 6 parts water was introduced into the reactor in order to destroy residual catalyst.

Step 15.—In order to purify the polymer and to eliminate the heavy inert diluent, a conventional low aliphatic solvent was utilized. In these particular runs Skelly A, B, and C (Skelly A, n-pentane; Skelly B, n-hexane; Skelly C, n-heptane) in about 250 parts by weight were utilized for this purpose.

Step 16.—The precipitate was centrifuged and filtered and washed with n-hexane (Skelly B) to insure complete removal of heavy non-solvent from the polymer.

Step 17.—The precipitate was air dried and measured for solids concentration.

Example I

Into a reactor purged with nitrogen was introduced:

| | | |
|---|---|---|
| Distilled acrolein monomer | grams | 100 |
| Emulsifier 24.5%, pH 1.4 | do | 12.2 |
| $H_2O$ | ml | 87.8 |
| Heavy non-solvent | ml | 100 |

The emulsifier is a commercially available polyacrolein-NaHSO$_3$ adduct. The solvent is a commercial odorless, heavy non-solvent having a medium boiling range of about 190–271° C. or 375–520° F. It is also called deodorized kerosene or Espesol #375. It is predominantly an aliphatic hydrocarbon mixture and is a cut above the BTX of benzene, xylene, toluene fraction.

The emulsion components were agitated thoroughly for about 30 minutes and then the two oxidant portions of the redox were added as follows:

Sequentially 0.815 gram of ammonium persulfate was added to the reaction mix and then 0.2 gram of tertiary butyl hydroperoxide. A 5 minute interval occurred between the initial persulfate addition and the subsequent hydroperoxide addition. The reactor was closed and external heat was applied to bring the reactor to 30° C. External cooling was then administered to keep the reaction at 30°±2° C. for 5 hours. During the first 3 hours, additional heavy non-solvent R–615 was introduced incrementally in 50 and 25 ml. portions at thirty minute intervals. At the end of 6 hours the reactor was opened and the polyacrolein precipitate was filtered and washed with Skelly A (n-pentane). The polyacrolein (PAC) weighed 107.6 grams; solids content 84%; yield 90.4%.

Example II

Into a reactor purged and repurged with nitrogen to eliminate oxygen was introduced:

| | | |
|---|---|---|
| Acrolein monomer, dist. | grams | 100 |
| Emulsifier, pH 1.4, see Example 1, 24.5% | do | 12.2 |
| $H_2O$ | ml | 87.8 |
| Solvent Fractola Mineral Oil, boiling point 328–403° C. (Standard Oil of Indiana) | ml | 100 |

The mixture in the reactor was agitated or stirred constantly for 25 minutes until a proper emulsion was obtained. Then sequentially with a 10 minute break the oxidant components of the redox were introduced as follows:

| | Grams |
|---|---|
| Ammonium persulfate (AP) | 0.815 |
| Tertiary butyl hydroperoxide (t-BHP)—10 minutes later | 0.216 |

The reactor was closed and temperature control was maintained at 30°±2° C. until completion of the reaction which took 6 hours. During the first 3 hours of the polymerization reaction additional mineral oil solvent was added incrementally at half-hour intervals in amounts of 20 ml. The total mineral oil solvent added was 100 ml. At the end of the reaction the polyacrolein (PAC) precipitate was filtered and washed with Skelly B (n-hexane). 104.3 grams was recovered; 89% solids; yield 92.8%.

Example III

Using the process of Example I with modification of the hydroperoxide, other hydroperoxides and peroxides were employed as follows:

A.—Tertiary amyl hydroperoxide
B.—Tertiary hexyl hydroperoxide
B$_1$.—Tertiary butyl hydroperoxide
C.—Cumene hydroperoxide
D.—Lauryl peroxide
E.—Benzoyl peroxide
F.—Dicumyl peroxide It was observed from the results that the alkyl hydroperoxides A, B and $B_1$ gave better results than C, D, E and F as evidenced by yields and polymer composition indicating higher molecular weights and a more useful product when combined with the ammonium persulfate.

Example IV

Into a previously nitrogen purged reactor chamber was introduced:

| | | |
|---|---|---|
| Distilled acrolein | grams | 100 |
| Emulsifier (see Example I) | do | 15 |
| $H_2O$ | ml | 85 |
| Solvent | grams | 50 |

The mixture was agitated for 15 minutes and sequentially 0.815 gram of AP (ammonium persulfate) and 10 drops (0.218 g.) t-BHP (tertiary butyl hydroperoxide) was added. The reaction was put on kettle by closing the reactor and a heat control was maintained at 30°±2° C. for 5 hours and 45 minutes. Additional heavy nonsolvent was added incrementally (dilution) by 20 ml. increments at half-hour intervals for the first 3 hours of the reaction so that the total added non-solvent during reaction was 100 grams. At the end of the reaction period the polymer was filtered and washed with Skelly B (n-hexane). The polymer weighed 104.3 grams; 89% solids; yield 92.8%.

Example V

Into a reactor previously purged and repurged with nitrogen was placed:

| | | |
|---|---|---|
| Acrolein monomer, dist. | grams | 100 |
| Polyacrolein bisulfite adduct, 20% solution | do | 15 |
| $H_2O$ (distilled and $O_2$ removed) | ml | 85 |
| Deodorized kerosene Ba #1 (purged with nitrogen | ml | 180 |

Later sequentially 0.815 gram of AP (ammonium persulfate) and 5 minutes later 10 drops of t-BHP (0.218 g.) was added. The reactor was closed and reaction temperature was brought to 30°±2° C. for 6 hours. At the end of the polymerization reaction, the precipitate was filtered and washed in Skelly B and C (n-hexane+n-heptane). The polymer recovered weighed 101.2 grams (powder) with a solids content of 90% and a yield of 91.2%.

Example VI

Into a purged reactor the following charge was introduced:

| | | |
|---|---|---|
| Acrolein monomer, dist. | grams | 100 |
| $H_2O$ | ml | 100 |
| Mineral oil | ml | 100 |
| PA—$SO_2$ 8% (emulsifier) | ml | 8 |

Subsequently at a spaced interval of 10 minutes the oxidant fractions of the redox were introduced into the kettle as follows:

| | Grams |
|---|---|
| AP (ammonium persulfate) | 0.815 |
| t-BHP | .88 |

The reactor was closed and brought under temperature control to 30°±2° C. for 6 hours. At 3 hours, 50 ml. of mineral oil was added. At the end of the 6 hours the polymer precipitate was filtered and washed in Skelly B and C (n-hexane+n-heptane). The recovered weight was 92.0 grams (powder); solids content 90%; yield 82.8%.

Example VII

As before, into a previously nitrogen purged chamber the following charge was introduced:

| | | |
|---|---|---|
| Acrolein monomer, dist. | grams | 60 |
| $H_2O$ | | 50 |
| Mineral oil (Superla White Oil #11232) | grams | 100 |
| Emulsifier PA—$SO_2$ 8% | ml | 10 |

The mixed oxidant component of the redox was introduced as follows:

| | Grams |
|---|---|
| AP | .8 |
| t-BHP (sequentially after 5 minutes) | .2 |

The reactor was closed and polymerization was carried out at 30°±2° C. for 5 hours with no intermediate mineral oil addition. At the end of that time the precipitate was washed with Skelly B (n-hexane) and dried. Weight 60; solids content 90%; yield 90%.

DEFINITION

The term "polymerizing under normal inert conditions" is defined under the present specification and claims to mean polymerizing in an inert atmosphere (e.g. $N_2$) under the temperature conditions set out in this specification and preferably about 0–40° C. at a slight positive pressure above 1 atmosphere (+1–5 pounds per square inch), and using a final molar ratio of acrolein: water: heavy solvent of preferably about 1:1:3 and ranging upward to about 1:1:5.

I claim:

1. In a process for emulsion homopolymerization of an $\alpha{:}\beta$ ethylenically unsaturated aldehyde monomer by means of a water-in-oil invert emulsion, the steps which comprise (1) using as the continuous oil phase a heavy inert aliphatic or aromatic non-solvent diluent having a boiling point range of about 175–600° C. in which both monomer and the water of the discontinuous aqueous phase are insoluble and (2) using as a polymerization addition catalyst a redox system consisting of an oxidant component comprising a mixture of ammonium persulfate and an active peroxide and a reducing component comprising a polyacrolein bisulfite adduct, and polymerizing under normal inert conditions, separating and recovering the $\alpha{:}\beta$ ethylenically unsaturated aldehyde polymer.

2. The process of claim 1, wherein the $\alpha{:}\beta$ ethylenically unsaturated aldehyde is acrolein.

3. The process of claim 1, wherein the redox oxidant comprises a mixture of ammonium persulfate and tertiary alkyl hydroperoxide in a ratio of about 5:1 to 1:5 by weight.

4. The process of claim 3, wherein the hydroperoxide is tertiary butyl hydroperoxide.

5. The process of claim 3, wherein the hydroperoxide is tertiary butyl hydroperoxide and the ratio of persulfate/hydroperoxide is about 4:1 by weight.

6. The process of claim 1, wherein the inert heavy non-solvent diluent is a mineral oil having a boiling point of about 175–600° C.

7. The process of claim 1, wherein the redox oxidant component ratio of ammonium persulfate/tertiary butyl hydroperoxide is about 4:1 by weight.

8. The process of claim 2, wherein the reactant ratio of acrolein to water to heavy solvent is about 1:1:1 by weight, and during the reaction the ratio of heavy non-solvent is increased to about 1:1:3 by weight to lower the viscosity and drive the reaction to the right.

9. The process of claim 2, wherein the initial reactant ratio of acrolein: water: heavy non-solvent is about 1:1:3 by weight and the polymerization reaction is performed without additional heavy non-solvent dilution.

References Cited

UNITED STATES PATENTS 3,129,195 4/1964 June et al.
3,326,858 6/1967 Rapean et al.

WILLIAM H. SHORT, Primary Examiner

L. M. PHYNES, Assistant Examiner